(12) United States Patent
Enmar

(10) Patent No.: US 10,596,683 B2
(45) Date of Patent: Mar. 24, 2020

(54) FIXTURE DEVICE FOR MANUFACTURE OF AERONAUTICAL STRUCTURES AND A METHOD FOR APPLYING THE DEVICE

(71) Applicant: SAAB AB, Linköping (SE)

(72) Inventor: Mats Enmar, Vreta Kloster (SE)

(73) Assignee: SAAB AB, Linköping (SE)

(*) Notice: Subject to any disclaimer, the term of this patent is extended or adjusted under 35 U.S.C. 154(b) by 125 days.

(21) Appl. No.: 15/021,321

(22) PCT Filed: Sep. 11, 2013

(86) PCT No.: PCT/SE2013/051056
§ 371 (c)(1),
(2) Date: Mar. 11, 2016

(87) PCT Pub. No.: WO2015/038041
PCT Pub. Date: Mar. 19, 2015

(65) Prior Publication Data
US 2016/0221691 A1    Aug. 4, 2016

(51) Int. Cl.
*B25B 11/02* (2006.01)
*B64F 5/10* (2017.01)
(Continued)

(52) U.S. Cl.
CPC .............. *B25B 11/02* (2013.01); *B64F 5/10* (2017.01); *G05B 19/19* (2013.01); *B23P 19/10* (2013.01);
(Continued)

(58) Field of Classification Search
CPC . B64F 5/10; G05B 2219/31286; G05B 19/19; B23P 19/10; B23Q 3/18; B23Q 3/186; B25B 11/00; B25B 11/02
See application file for complete search history.

(56) References Cited

U.S. PATENT DOCUMENTS 4,245,828 A * 1/1981 Aldag ................. E04B 1/24
269/228
4,381,104 A * 4/1983 Nelsen ................ A63H 27/02
269/101
(Continued)

FOREIGN PATENT DOCUMENTS

DE    688593 A    2/1940
DE    689047 C    3/1940
(Continued)

OTHER PUBLICATIONS

PCT/ISA/210—International Search Report—dated Jun. 2, 2014 (Issued in Application No. PCT/SE2013/051056).
(Continued)

*Primary Examiner* — Jennifer L Norton
(74) *Attorney, Agent, or Firm* — Venable LLP; Jeffri A. Kaminski

(57) ABSTRACT

A fixture device for holding a first structural article in mutual position relative to a second structural article. A fixing arrangement includes a first end and a second end. Each of the first end and the second end are configured to be operatively connected to the first structural article and the second structural article. A coupling arrangement is configured to be releasably coupled to the first structural article and the second structural article and to the fixing arrangement. Also, a method for manufacturing a structure, a production line for manufacturing a structure and a data medium storing program.

3 Claims, 6 Drawing Sheets

(51) Int. Cl.
*B25B 11/00* (2006.01)
*G05B 19/19* (2006.01)
*B23P 19/10* (2006.01)
*B23Q 3/18* (2006.01)

(52) U.S. Cl.
CPC ............... *B23Q 3/18* (2013.01); *B23Q 3/186* (2013.01); *B25B 11/00* (2013.01); *G05B 2219/31286* (2013.01)

(56) References Cited

U.S. PATENT DOCUMENTS

| | | | |
|---|---|---|---|
| 4,894,903 A | 1/1990 | Woods | |
| 4,925,620 A * | 5/1990 | Aiello | G21C 7/113 219/121.63 |
| 4,945,488 A | 7/1990 | Carver et al. | |
| 5,033,014 A * | 7/1991 | Carver | G05B 19/4097 700/182 |
| 5,033,178 A * | 7/1991 | Woods | B25B 11/00 29/243.57 |
| 5,046,688 A * | 9/1991 | Woods | B23K 37/0443 244/123.1 |
| 6,141,848 A * | 11/2000 | Yousko | B21J 15/10 227/111 |
| 6,314,630 B1 | 11/2001 | Munk et al. | |
| 6,481,697 B1 * | 11/2002 | Brown | E04F 11/1812 256/59 |
| 6,496,745 B1 * | 12/2002 | Killian | G05B 19/41805 244/119 |
| 6,675,467 B2 * | 1/2004 | Oatridge | B62D 65/02 29/712 |
| 6,743,504 B1 * | 6/2004 | Allen | B29C 70/446 428/362 |
| 2002/0074851 A1 * | 6/2002 | Montgomery, Jr. | E21C 35/197 299/107 |
| 2002/0121586 A1 * | 9/2002 | Gates | E04G 11/14 249/45 |
| 2003/0000077 A1 * | 1/2003 | Miller | B23P 19/04 29/799 |
| 2003/0034602 A1 | 2/2003 | Kavanaugh | |
| 2003/0046801 A1 | 3/2003 | Engstrom et al. | |
| 2004/0155219 A1 * | 8/2004 | McCarty | F16B 7/0426 251/357 |
| 2006/0162140 A1 | 7/2006 | Frauen et al. | |
| 2009/0282668 A1 | 11/2009 | Sanchez-Brunete Alvarez | |
| 2011/0001010 A1 * | 1/2011 | Tacke | B64C 1/061 244/131 |
| 2016/0089871 A1 * | 3/2016 | Hildebrandt | B32B 38/1833 156/580 |
| 2017/0043529 A1 * | 2/2017 | Sanderson | G05B 19/4099 |
| 2017/0144779 A1 * | 5/2017 | Sisco | B23P 23/06 |
| 2017/0218615 A1 * | 8/2017 | Carless | E04C 2/284 |
| 2018/0066790 A1 * | 3/2018 | Azusawa | G01B 11/00 |
| 2018/0104775 A1 * | 4/2018 | Turner | B23P 15/00 |

FOREIGN PATENT DOCUMENTS

| | | | |
|---|---|---|---|
| FR | 541800 A | 8/1922 | |
| FR | 635208 A | 3/1928 | |
| GB | 238212 A | 8/1926 | |
| GB | 313163 A | 12/1929 | |
| WO | WO-2018203190 A1 * | 11/2018 | ............ B64C 1/26 |

OTHER PUBLICATIONS

PCT/IPEA/409—International Preliminary Report on Patentability—dated Dec. 16, 2015 (Issued in Application No. PCT/SE2013/051056).
PCT/ISA/237—Written Opinion of the International Searching Authority—dated Jun. 2, 2014 (Issued in Application No. PCT/SE2013/051056).
Supplementary European Search Report dated Apr. 13, 2017 in European Patent Application No. 13893533.3 (6 pages).
European Office Action dated Apr. 6, 2018 issued in European Patent Application No. 13 893 533.3 (5 pages).

* cited by examiner

FIXTURE DEVICE FOR MANUFACTURE OF AERONAUTICAL STRUCTURES AND A METHOD FOR APPLYING THE DEVICE

CROSS-REFERENCE TO RELATED APPLICATIONS

This application is the national phase under 35 U.S.C. § 371 of PCT/SE2013/051056 filed 11 Sep. 2013.

TECHNICAL FIELD

The present invention relates to a fixture device and to a method for manufacture of a structure. The invention also regards a data medium storing program comprising a program code, which program when run on a computer executes the method according to the invention. The invention also regards a production line adapted to make use of the data medium storing program for executing the method.

The invention relates to the aeronautical industry and aircraft industry especially. The invention is not limited thereto, but can be used also in automotive engineering, for manufacture of trains, wind power blades etc. Preferably, the invention relates to automatized production of aeronautical structures.

BACKGROUND ART

Current technology is commonly based on jig tools for in mutual positioning and fixating the structural articles relatively each other. Also other types of tools are described in the document U.S. Pat. No. 4,945,488, wherein also being disclosed a measuring means and a computer for comparing data model coordinates with selected portions of the structure to be assembled. In said document U.S. Pat. No. 4,945,488 is shown a grid surface onto which the articles being mutually positioned before the assembly, thus holding the structural articles in position relative each other.

An object of the present invention is to provide a fixture device (e.g. a jig), which being cost-effective to use in a production line.

An object is to provide a fixture device that can be used for assembly of different types and designs of structures without the need of customizing the fixture device for each structure design.

An object is to provide a fixture device that is easy to use without the need of building a new jig each time a new design of an aeronautical structure is to be made.

An object is to provide a fixture device comprising a fixing arrangement (or part of it) being releasable from the fixture device without the need of demounting any/or some of the structural articles.

An object is to provide a fixture device that can be re-designed in short time.

An object is to provide a fixture device that uses a standardized module system of fixing arrangement and coupling arrangement.

An object is to provide a fixture device that is time saving in production of aeronautical structures.

An object is to provide a rigid fixture device, which during assembly can be transported in a work-shop.

An object is to provide a fixture device that is mobile together with the assembly of structural articles.

An object is to provide a built-in automatic measure control of the fixing arrangement.

An object is to provide easy access to the interior of the structure during the assembly.

The foregoing and other objects and advantages of the present invention will be apparent to those skilled in the art, in view of the following detailed description, taken in conjunction with the appended claims and the accompanying drawings.

SUMMARY OF THE INVENTION

This has been solved by the fixture device mentioned in the introduction.

In such way is achieved a standardized tooling concept for holding the structural articles in position during assembly.

Suitably, the coupling arrangement comprises holes of the structural articles, which holes are in same mutual position of each structural article, so that the fixing arrangement will be aligned and extending linear and/or parallel through the assembly.

Preferably, the spacing between the structural articles is similar and/or set by a pre-determined measure of the fixing arrangement.

In such way is provided that holding and coupling tool parts will be used in a module system in an efficient way. The fixture device can thus be designed prior manufacture of the structural articles per se and can be used for assembly of different constructions (structures). As the module system tool parts being adapted to a data interface model being used by many designers at the same time, there may be a parallel assembly and/or production or even several assembly stations using the same module system.

The data interface model is defined by a computer system and preferably a master design definition of an aircraft provided in a data base. The computer system runs a three-dimensional graphics data program and the master design definition being chosen as a 3-D coordinate point graphics program.

Thereby is achieved a fixture device that promotes a cost-effective manufacture of aeronautical structures each comprising a plurality of structural articles. This is made by means of easy mounting and demounting of fixing bars (distance holding bars or similar) between the structural articles for holding them in proper position prior attachment (connection/mounting) of stringers/skins etc. onto the structural articles (such as bulkheads, ribs etc.) held in said mutual position relatively each other.

The definition of the first and second structural article comprises different types of articles and/or sub-structures, which are designed to be connected to stringers or other stiffening and/or strengthening articles (or other articles or so called complementary structural articles) joining (connecting) the first and second structural article (preferably a plurality of structural articles) to each other for forming an aeronautical structure (body).

Said stringers/skins etc. can thus be defined as complementary structural articles for providing the finished article (such as an aircraft/aeronautic structure or body).

When the first and second structural articles are held in mutual position, the complementary structural articles are mounted to the first and second structural articles.

The fixing arrangement is subsequently demounted from the first and second structural article.

The fixture device can thereby be of low weight and therefore used as a mobile unit and easy adapted to the assembly of different types of structures by means of coupling and uncoupling of fixing arrangement (e.g. fixing bars) to/from the first and second structural article just by using units of the fixing arrangement (e.g. fixing bars) of different lengths. These module units are suitably stored within the production line. The fixing arrangement preferably being elongated and each fixing arrangement (bar) unit comprises a first end and a second end. Each end being provided for coupling to opposite positioned, an at a predetermined distance from each other, structural articles.

Suitably, the coupling arrangement of the structural article comprises a plurality of couplings, which can be mounted to the structural article at positions (beforehand and already set/determined on "drawing table" and in view of designer wish) relatively a centre line of the finished article and in a plane lying parallel and/or co-planar with the extension of the structural article face. Said first end fits into a coupling of the first structural article and the second end fits into a coupling of the following second structural article.

Such low weight fixing device can also be adapted to a semi-automatized or automatized production line as it can make use of the fixing arrangement or fixing bars of pre-determined lengths. In such case the fixing arrangement being positioned by means of a robot apparatus.

Suitably, the structural article being planar.

Preferably, the fixing arrangement is connectable to a reference base element.

Suitably, the coupling arrangements of the structural article are arranged in a common plane.

Preferably, there is provided a fundament (reference base element) of the fixture device, also serving as a mounting body (e.g. a plate) onto which the fixture device stands at the same time as the mounting body (plate) upper side serves as a reference plane for the fixing arrangement. Such fundament also promotes application of the fixture device as a mobile fixture not bound to a specific place in workshop. It is just to move the base element as a part of the fixing device without the need of demounting the structural articles from each other.

Preferably, the reference base element forms a structural article.

Suitably, the fixing arrangement exhibits a pre-determined length.

The length is determined so that a fixed distance between the first structural article and the second structural article is achieved. Thereby is provided a fixing arrangement in the form of elongated fixing and distance holding bar/bars preferably having at each end a quick coupling device as part of the coupling arrangement for coupling the first structural article to the second structural article at a pre-determined distance from each other.

Preferably, there are different pre-determined lengths of the fixing arrangement being used in a module system. Already at the drawing table, the designer takes into account the present module system when designing the aeronautical structure (body).

Preferably, the fixing arrangements are connectable to each other via the articles for holding the articles in said mutual positions relative the reference base.

Alternatively, the length of the fixing arrangement is set from the actual distance between the first structural article and the second structural article.

Suitably, the fixing arrangement length is set by an adjustable telescoping device.

Preferably, the coupling arrangement is provided to be releasable coupled to the articles and to the fixing arrangement.

In such way is achieved that the coupling arrangement can be removed from the structural body/aeronautical article and at the same time is provided that during the assembly of articles a separate fixing arrangement (e.g. a bar) can be removed (for mounting personnel reaching the interior) without the need of demounting the entire assembly.

Suitably, the fixing arrangement comprises a plurality of elongated connection bars.

In such way a module system being achieved and the bars can be stored in a storage holder, wherein control of bar length in situ being made when the bars are stored and not coupled to the structural article. The mounting personnel will thus achieve proper distance between the structural articles when building the aeronautical structure.

Thereby is achieved that no type-specific tools are needed for the assembly.

Such module system also promotes that the fixture device can be used in a "tool interface model" computer system, wherein a designer efficient may re-arrange the tool in short time and with minor learning.

In such way is achieved a fixing arrangement having tool arrangements (fixing and coupling arrangements) that can be manufactured beforehand, even before the articles per se are designed on the drawing table. This provides a cost-effective module system which can be used for different applications, but with standardized fixing and coupling arrangements.

Preferably, the coupling arrangement being provided to be fitted in apertures of the articles.

In such way is achieved that weight is saved for the aeronautical structure at the same time as the coupling arrangement always finds its exact position relative the centre line. Such feature also promotes the use of automatization of the production line.

Suitably, the apertures are through holes of the structural article.

Preferably, the coupling arrangement comprises quick coupling members.

In such way is achieved that cost-effective production is achieved.

The fixing arrangement (e.g. fixing bar) could be coupled to the first and second structural articles by means of so called quick couplings, each comprising a male part and a female part.

Preferably, the fixing arrangement (e.g. fixing bar) per se is connectable to the couplings via quick coupling means, e.g. modified bayonet coupling or "snap" coupling, wherein the respective coupling being releasable attached to the structural article.

Preferably, the female part of the respective coupling being connected to the respective structural article by means of a thread means provided in a bore hole of the respective structural article.

Preferably, three fixing bars being coupled between two structural articles for holding them in proper angle (in plane) relatively each other.

Suitably, the fixing arrangement between two structural articles being one single hourglass shaped bar having flat bar ends. This is beneficially for assembly of articles, where the article exhibits minor extension in a transverse plane.

A set of second level fixing (fixing arrangement) bars also exhibits first and second ends. The first ends are coupled to couplings of the second structural article and second ends are coupled to couplings of a third structural article. The length of respective fixing bar preferably corresponds to the distance between the second and third structural article surfaces facing each other.

Alternatively, the lengthwise measure (taken in a direction parallel with the centre line) of the fixing bar (fixing arrangement) and associated couplings defines the distance and/or determined measure between said surfaces for each level.

The respective (preferably at least three holes of each structural article) hole being positioned relatively a centre line (preferably, the extension of co-linear bore holes are parallel with the centre line) of the finished structure and is provided at beforehand determined position at the plane of the extension (the plane is suitable transverse the centre line of the structure) of the structural article. By providing said extension of the bore holes and suitably provide them as through holes, said coupling and thereby the associated fixing bars always will be oriented properly relatively the centre line. This promotes the application of a module fixture device in a cost-effective way.

The finished article preferably comprises a plurality of structural articles connected to the complementary structural articles, thus forming a structural body/aeronautical structure.

This has also been solved by a method.

Preferably, the step of positioning the first article being made relatively a reference base element.

Suitably, the step of positioning the coupling arrangement comprises mounting of the latter to the article.

Preferably, the step of coupling the fixing arrangement to the coupling arrangement is achieved by radial insertion and axial rotation of the fixing arrangement relatively the coupling arrangement.

Suitably, the method comprises a step of coupling a transverse stiffener to the fixing arrangement.

This is also solved by a production line.

This is also solved by a data medium storing program.

This is also solved by a data medium storing program product.

Thereby being achieved the effects discussed herein.

The inventive solutions achieved by the invention can be taken into account for all embodiments.

BRIEF DESCRIPTION OF THE DRAWINGS

The present invention will now be described by way of examples with references to the accompanying schematic drawings, of which.

DETAILED DESCRIPTION

Hereinafter, embodiments of the present invention will be described in detail with reference to the accompanying drawings, wherein for the sake of clarity and understanding of the invention some details of no importance are deleted from the drawings. Where indicative of continuity between different figures, the same references can be used for same or similar details of the figures.

Figure 1A:
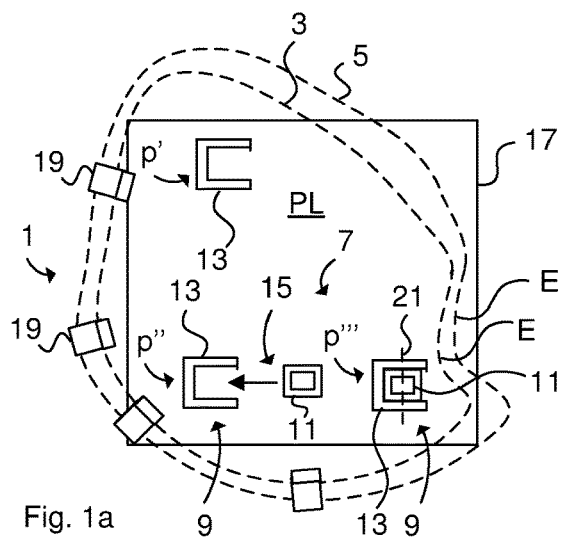
FIG. 1a illustrates a fixture device in a view from above according to one aspect of the invention.

FIG. 1a schematically illustrates a fixture device 1 in a view from above according to one aspect of the invention. The FIG. 1a shows a fixture device 1 for holding in mutual position a first structural article 3 relatively a second structural article 5 of composite. The fixture device 1 comprises a fixing arrangement 7 connectable to a coupling arrangement 9 of the respective first 3 and second 5 structural article. The fixing arrangement 7 comprises three rods 11 having square cross-section. At each face of the first structural article 3, the coupling arrangement 9 comprises three female coupling parts 13 provided for fitting with a first end 15 of respective rod 11. The respective female coupling part 13 exhibits an open side for insertion of the respective first end 15. The respective female coupling part 13 is moulded as a breakable and integrated part of the structural articles 3 forming the structure. A reference base element is designed as a mobile jig fundament 17 for carrying and fixing the rods 11 in a plane PL transverse the extension of the rods 11. The mobile jig fundament 17 comprises pre-determined fixing positions p', p'', p''' for fixing the rods 11 in positions adapted to the structure to be assembled. A data model initiated in a control unit (not shown) is provided and comprises an engineering definition of the structure to be assembled. A designer will already on the "drawing table" take into account the positions p', p'', p''' of the female coupling parts 13 of the structural articles 3. Even though peripheral edges E (shapes) of the structural articles 3, 5 exhibit different shapes/contours, the respective position p', p'', p''' of the female coupling parts 13 of each structural article 3 seen in said plane PL corresponds with corresponding position of the female coupling parts 13 of other structural articles 5 in their planes. The respective rod 11 thus extends orthogonal to said plane PL. The peripheral edges E of the structural articles 3, 5 are to be fitted with complementary structural articles, in this case stringers 19. Pin bolts 21 are removed from the female coupling parts 13 and the rods 11 are removed from the female coupling parts 13. Thereafter, the breakable female coupling parts 13 are broke away from the structural articles 3, 5 by means of a removal tool (not shown).

Figure 1B:
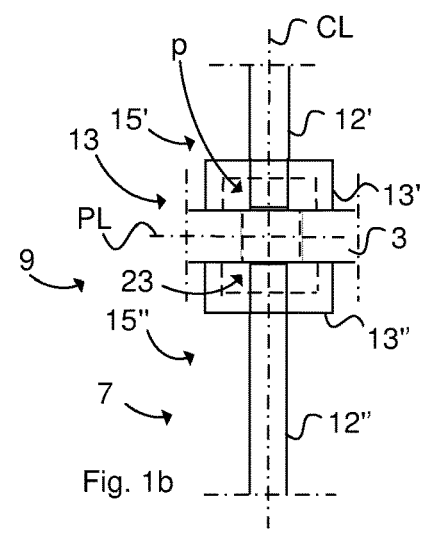
FIG. 1b illustrates a coupling arrangement of a structural article according to one aspect of the invention.

FIG. 1b schematically illustrates a coupling arrangement 9 of a structural article 3 according to one aspect of the invention. The respective structural article 3 has been provided with bore holes 23 at positions p in plane PL and corresponding with same positions (not shown) in plane PL of the other structural articles 5. The bore holes 23 are fitted with female coupling parts 13. A first end 15 of a first level bar 12' has been inserted into a first female coupling part 13' and releasable fitted into position. A second end 15" of a second level bar 12" has been inserted into a second female coupling part 13" and releasable fitted into position. The first level bar 12' is in line with the second level bar 12". The coupling arrangement 9 is provided to be releasable coupled to the structural article 3 and to the fixing arrangement 7. After mounting of the stringers (not shown) to the structural articles 3, 5, the respective bar 12', 12" being demounted. Thereafter, the female coupling parts 13', 13" are demounted from the respective structural article 3, 5.

Figure 2A:
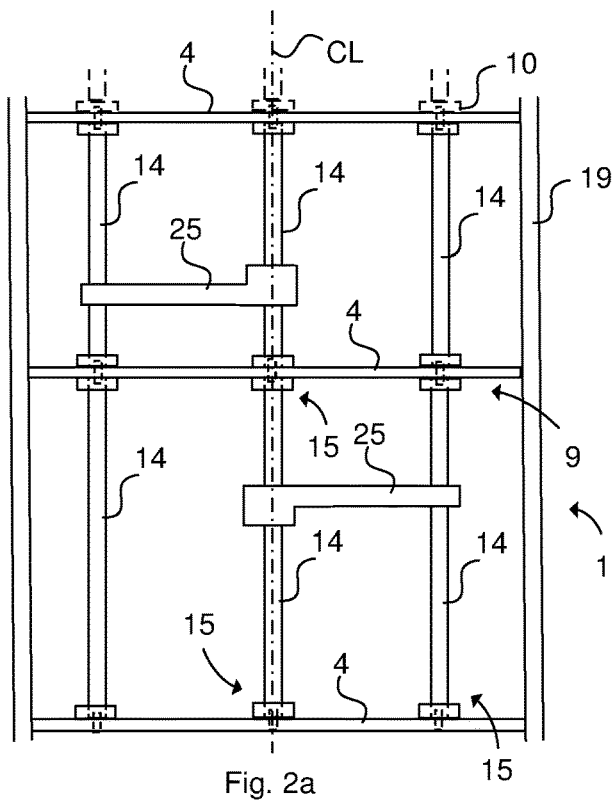
FIG. 2a illustrates a fixture device in a side view according to one aspect of the invention.
Figure 2B:
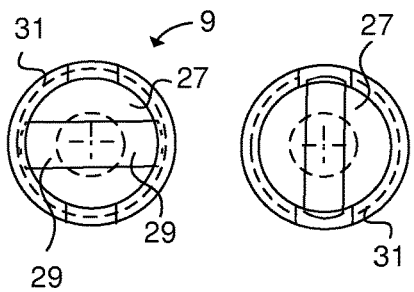
FIG. 2b illustrates a coupling arrangement according to one aspect.
Figure 2C:
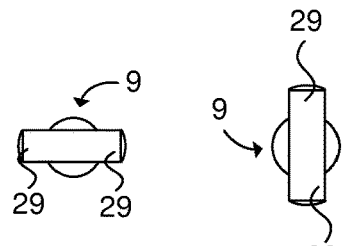
FIG. 2c illustrates a male part of a coupling arrangement according to one aspect.

FIG. 2a illustrates a fixture device 1 in a side view according to one aspect of the invention. Spars 4 are to be connected to each other via elongated beams 14. Each spar 4 is fitted with removable coupling arrangements in the form of quick coupling members 10. For holding the assembly in proper extension, stabilization tools 25 can be mounted between the elongated beams 14. FIG. 2b illustrates a coupling arrangement 9 according to one aspect being shown from beneath. An upper front wall 27 is provided for retaining two protrusions 29 of a beam end. A side wall of the coupling arrangement 9 is provided with a groove 31 for guiding the protrusions 29 into a locked state. The side wall is open in sections opposite each other so that the protrusions 29 can be rotated to a free position and the respective elongated beam 14 can be coupled and uncoupled to and from the coupling arrangement 9 in an efficient way. FIG. 2c illustrates the protrusions 29 of the respective beam end 15 of the coupling arrangement 9 according to one aspect. By rotating the beam 14 and pull/push action, a quick release and mounting of the fixture device 1 is achieved.

Figure 3:
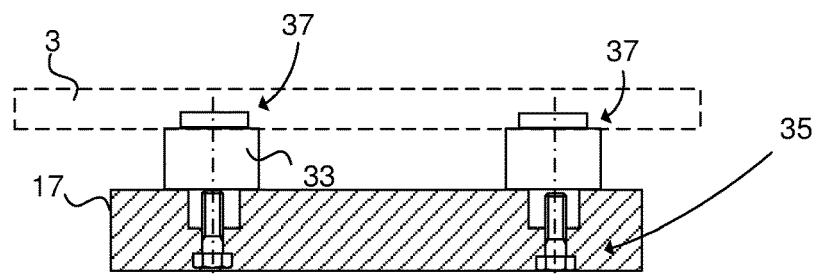
FIG. 3 illustrates a reference base element according to one aspect.

FIG. 3 illustrates a reference base element 17 (jig plate) according to one aspect. Distance blocks 33 are arranged to the reference base element 17 serving for holding the first structural article 3 in position. The assembled structure can easy be demounted from the reference base element 17 if needed by means of loosing bolts 35. As a first step in this embodiment, the first structural article 3 is located in position and fixed to the jig plate via tooling holes 37 and the distance blocks 33.

Figure 4:
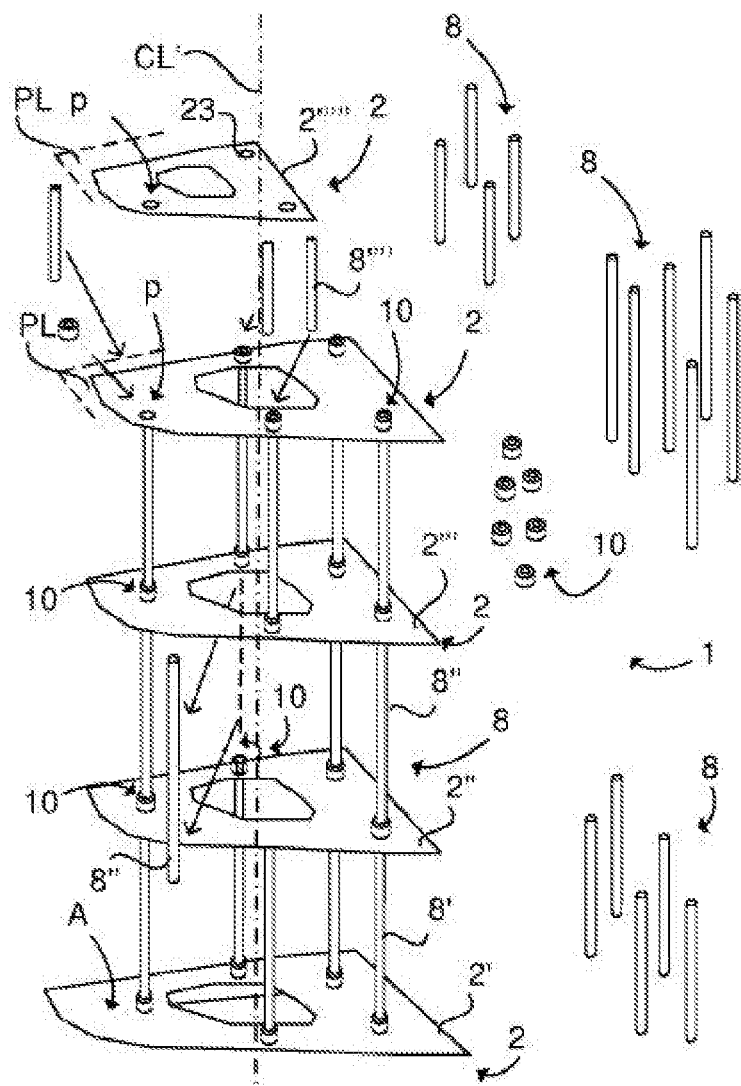
FIG. 4 illustrates a fixture device in a perspective view according to one aspect of the invention.

FIG. 4 illustrates a fixture device 1 in a perspective view according to one aspect of the invention. Holding tools 8 hold frames 2 for forming the structure to be assembled. Alternatively, the frame constituting a first frame 2' that can be connected to a mobile fundament (not shown). The frames 2 held in mutual positions relatively each other are to be connected to each other via stringers and skin plates (not shown) forming the structure. The frames 2 comprise tooling hole positions p and tooling hole 23 sizes being equal to each other. The tooling holes 23 are provided in the same production procedure as manufacture of the respective frame 2. The positions p of the tooling holes 23 are set already at the drawing table from a tool interface data model. Thus, the frame 2 and structure being designed taking into account the positions p of the tooling holes 23. A master datum file is determined and corresponds in this case to the first frame 2'. A tooling contact area A of a first level frame holder tool 8' is determined from the master datum file. The first level frame holder tools 8' are mounted to the first frame 2'. The first level frame holder tools 8' are installed by a quick coupling arrangement 10. A second frame 2" is mounted by means a further quick coupling arrangement 10 to the first level frame holder tools 8'. Second level frame holder tools 8" are installed to the second frame 2" upper side by coupling the quick coupling arrangement 10 mounted to the second frame 2" upper side. A third frame 2'" is mounted to the second level frame holder tools 8". The mounting procedure is performed until the next step is the last for forming the structure to be built, whereby the assembly is ready to be fitted with the stringer and skin plates (not shown) for forming the structure. In this case, the last frame 2'" is a minor frame but still exhibiting and utilizing the same positions p of corresponding tooling holes as the rest of the frames (i.e. same positions p in plane PL as the positions p for the other frames) (i.e. the holder tools being connected to each other via the coupling arrangement 10 and in line with each other). The lengths of the frame holder tools 8 are predetermined and in this case set to one common measure, besides the frame holder tools 8'" of the last level which are of shorter length. The frame holder tools 8 are designed as standard tools of the production line, but can be of different pre-determined lengths. The designer will use the tool interface model when drawing the structure and takes into account the distance between the frames 2 in view of the standardized frame holder tools 8 in the production line. Such fixture device 1 is suitably to use in a module system, which module system is stored and used in a work-shop (preferably semi- and/or fully automatized production line) also even if the structure not yet has been constructed by the designer. Centre line CL' is defined of the structure 43 and planes of the frames 2 are perpendicular to the centre line CL'.

In such way the spacing between the frames 2 is set by a pre-determined measure of the frame holder tools 8, being present in said module system. The fixture device 1 can thus be constructed prior manufacture of the frames 2 and can be used for different constructions. As the module system holder tools 8 being adapted to a data interface model being used by many designers at the same time, there can be provided a parallel assembly and/or production or even several assembly stations using the same module system in a productions line. Such module system also promotes an assembly that can be moved in a work-shop, as the holder tools 8 are easy to demount and regroup or, alternatively, the fixture device 1 comprising the assembly can be moved per se and the assembly can thus be made mobile due to the fact that the holding tools 8 rigidly hold the frames 2 in mutual position relatively each other by means of the fixing arrangement 7.

The design of the fixture device 1 also promotes that selected holding tools 8 can be demounted from the assembly for better access to the interior of the assembly, without the need of removal of specific frames 2 or even without the need of demounting the whole assembly.

The designer will use the tool interface model, wherein is taken into account the predetermined positions of the tooling holes 23. During manufacture of the frames 2, the tooling holes 23 are drilled at said proper positions p in the frames 2.

Figure 5A:
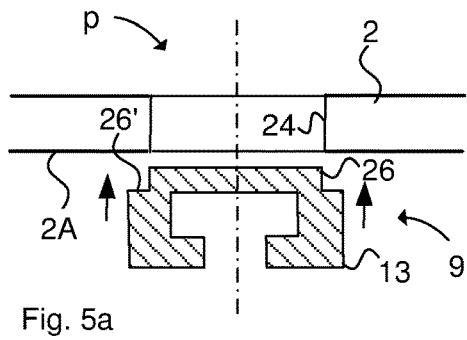
FIGS. 5a to 5e illustrate a coupling arrangement according to one aspect.
Figure 5D:
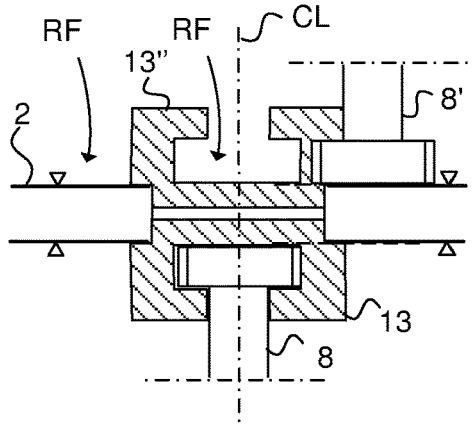
Figure 5B:
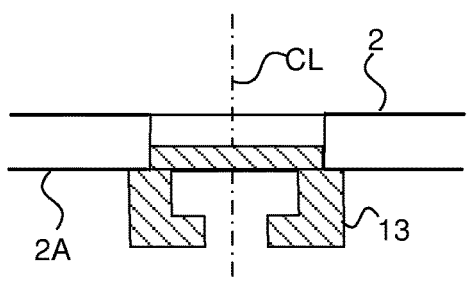
Figure 5C:
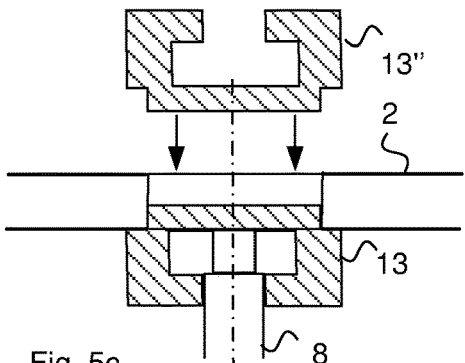
Figure 5E:
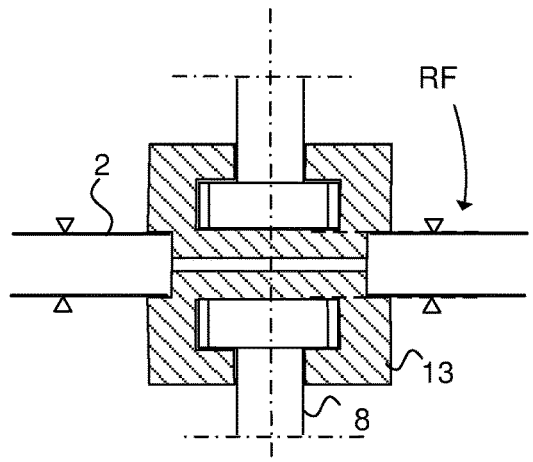

FIGS. 5a to 5e illustrate a coupling arrangement 9 according to one aspect. A structural frame 2 is provided with a through hole 24 in a position p determined by a data interface model, which position p corresponds to the positions of corresponding through holes 24 of other structural frames 2 of the structure. A female coupling part 13 is mounted onto a first side 2A of the structural frame 2 as being shown in FIGS. 5a and 5b, wherein a insertion part 26 of the female coupling part is inserted into the through hole 24. A shoulder 26' of the insertion part 26 abuts the surface (reference plane RF) of the structural frame 2. The corresponding holding tool 8 is connected to the structural frame 2 via the female coupling part 13 by means of a "push-in and turn" action of the holding tool 8. In FIG. 5c is shown that a second female coupling part 13" is mounted in the through hole 24 free portion. As shown in FIG. 5d a reference plane RF of the female coupling part 13, 13" is in plane with the structural frame reference plane RF taking account the thickness of the structural frame 2. The reference plane RF serves as an abutment face for abutment between the holding tool 8 and the reference plane RF, so that the distance between the opposite structural frames 2 always corresponds to the length of the holding tool 8. The next level holding tool 8' is connected to the structural frame 2 by means of a further "push-in and turn" action and the structural frame 2 being mounted at a proper distance from opposite structural frames (not shown).

Figure 6A:
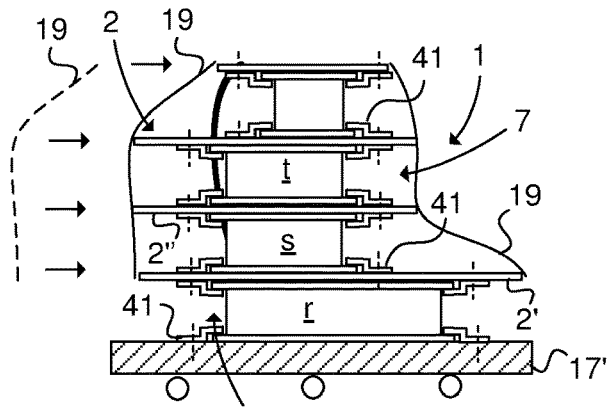
FIGS. 6a and 6b illustrate a fixture device and a structure respectively in a side view according to one aspect of the invention.

FIG. 6a illustrates a fixture device 1 in a side view according to one aspect of the invention. This embodiment uses a fixing arrangement 7 in the form of one single distance holding tool r, s, t for each level. The single distance holding tool s is connectable to a first 2' and a second 2" frame by means of clamps 41. A further single distance holding tool t is connected to the second frame 2" and a third frame 2'". Each distance holding tool exhibits a pre-determined length and constitutes a tool part of a module system. The clamps 41 are provided to be releasable coupled to the respective frame 2 and to the respective distance holding tool r, s, t. Clamps 41 also fixate the lower distance holding tool r to a movable fundament 17'. Stringers 19 are mounted to the assembly of frames 2 for forming an aircraft structure 43. Subsequently, the respective single distance holding tool r, s, t must be demounted from the assembly.

Figure 6B:
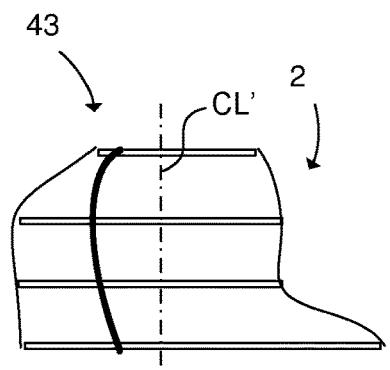

FIG. 6b illustrates the aircraft structure 43, which has been manufactured in a simple and efficient way by using the fixture device 1 in FIG. 6a. The fixing arrangement 7 and the coupling arrangement 9 in FIG. 6a are demounted from the structure 43 after driving the movable fundament 17' to a position for demounting the clamps 41 and holding tools r, s, t. Centre line CL' is defined of the structure 43 and planes of the frames 2 are perpendicular to the centre line CL'.

Figure 7:
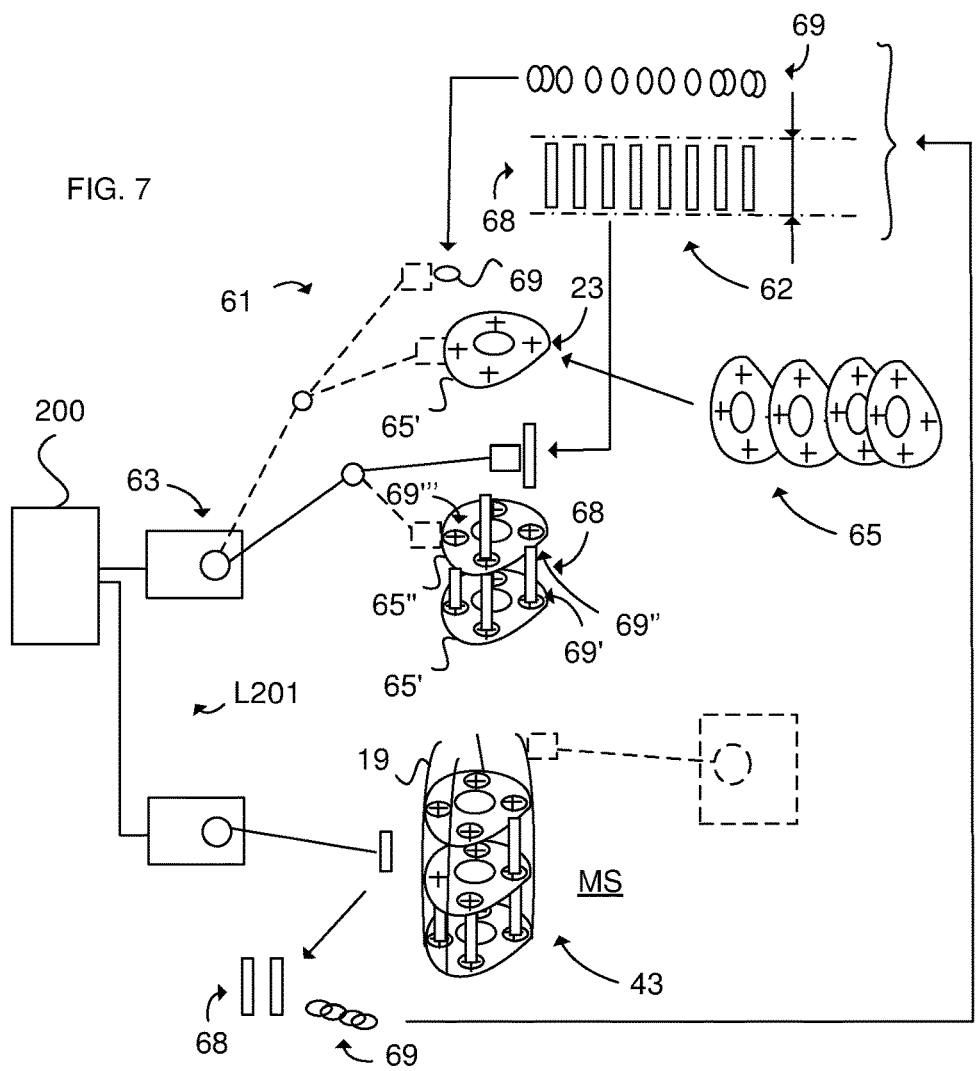
FIG. 7 illustrates a production line according to one aspect of the invention.

FIG. 7 illustrates a production line 61 according to one aspect of the invention. A control unit 200 is provided for controlling the manufacture of aircraft structures 43 in the production line 61. The control unit 200 is fed with data from a tool interface data model and 3-D design virtual design data of the actual structure 43 to be manufactured. The productions line 61 comprises storage means 62 for storing holding tools 68 of different pre-determined lengths in a module system. The storage means 62 is provided to monitor and control the lengths L of the holding tools 68 when not being used. The storage means 62 is also provided for storage of couplings 69. Frames 65 to be assembled in mutual positions relatively each other have been separately manufactured and have been transported to the production line 61. A robot apparatus 63 mounts four first frame upper couplings 69' to tooling holes 23 of the first frame 65' upper side and thereafter mounts a first set of holding tools 68 to said couplings 69'. The robot apparatus 63 thereafter mounts a second frame 65", already provided with four second frame lower couplings 69" mounted in its tooling holes, to the first set of holding tools 68. Four second frame upper couplings 69'" are thereafter mounted to the upper side of the second frame 65". The procedure proceeds until the last frame of the structure 43 has been mounted. The assembly is moved to a next mounting station MS and stringers 19 are mounted by means of a robot apparatus to frame edges of the frames 65 for forming the structure 43. When the structure 43 constitutes a frame-work comprising frames 65 and stringers 19, the robot apparatus 63 demounts the holding tools 68 and the couplings 69 from the assembly. The holding tools 68 and the couplings 69 are transported back to the storage means as tool parts of a module system.

Figure 8A:
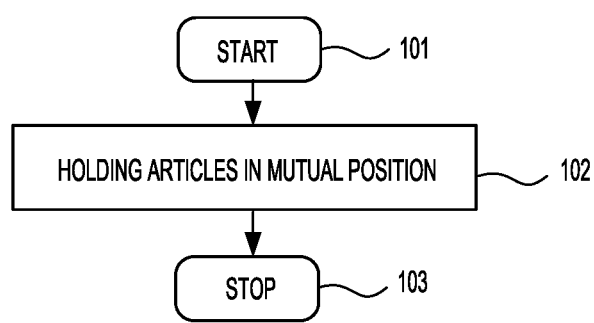
FIGS. 8a and 8b illustrate flowcharts showing methods according to different aspects of the invention.

FIG. 8a illustrates a flow chart of the method according to one aspect o the invention. The method starts in a Step 101. In Step 102 is provided a method for manufacture of a structure 43 by holding in mutual position a first structural article 3 relative a second structural article 5. In Step 103 the method is fulfilled and stopped. The step 102 thus comprises the steps of; providing the first 3 and second 5 structural article; providing the fixing 7 and the coupling 9 arrangement; positioning the first structural article 3 and the coupling arrangement 9; coupling the fixing arrangement 7 to the coupling arrangement 9 of the first structural article 3; coupling the coupling arrangement 9 of the second structural article 5 to the fixing arrangement 7; repeating the previous steps; and releasing the fixing and the coupling arrangement 7, 9 from the structure 43 after mounting of complementary structural articles 19 to the structural articles 3, 5.

Figure 8B:
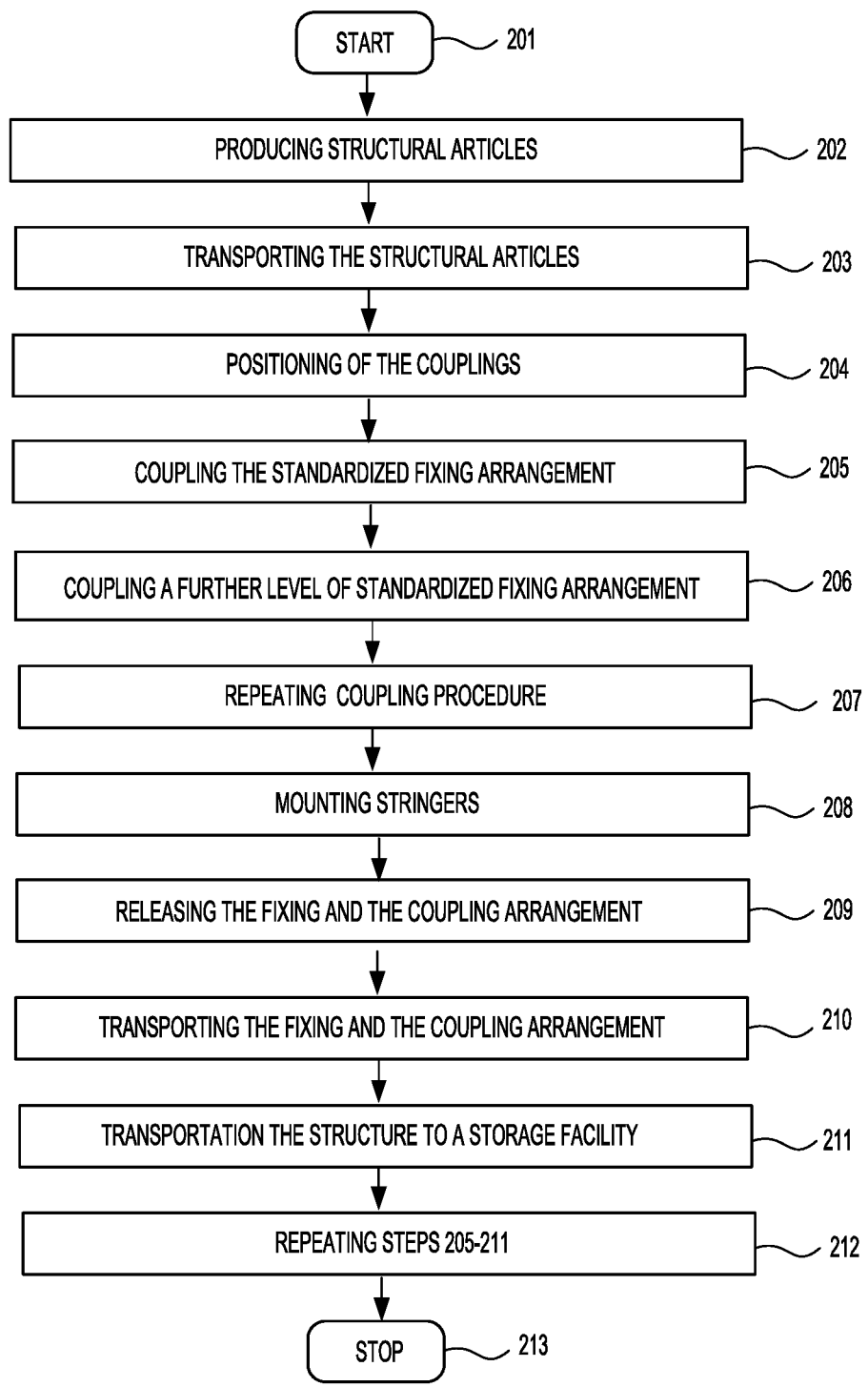

FIG. 8b illustrates a flowchart for a method for manufacture of a aeronautical structures 43 by holding in mutual position a first structural article 3 relative a second structural article 5, using a fixing arrangement releasable coupled to a coupling arrangement releasable mounted to the articles, according to one aspect of the invention. Step 201 corresponds to a starting (start-up) of a production line by providing hardware and software for constructions and design of the structures and comprising structural articles, according to one aspect, taking into account the lengths and positions of fixing arrangements 7. It also defines the providing of the standardized fixing arrangements 7 and coupling arrangements 9, which are to be used in the production line. Alternatively, the fixing 7 and coupling 9 arrangements are stored in a storage means 62 comprising measurement monitoring functionality for monitoring the lengths of the standardized fixing arrangements 7. Step 202 defines the production of serial sets of structural articles 3, 5 to be assembled in the automatized manufacture of structures 43. The structural articles 3, 5 are moulded and machined by means of an automatic procedure wherein tooling holes 23 are provided in each of the structural articles 3, 5 at positions determined by a data interface model of the software. Step 203 defines the transportation of the structural articles to the production line. Step 204 defines the positioning of the couplings of the coupling arrangement to the first structural article and also the positioning of couplings 9 to the other structural articles of each structure to be assembled. Step 205 defines coupling of the standardized fixing arrangement to the coupling arrangement of the first structural article and to the coupling arrangement of the second structural article. Step 206 defines sequent coupling of a further level of standardized fixing arrangement 7 to the coupling arrangement 9 of the second structural article and to the coupling arrangement of a third structural article. Step 207 defines the repeating of similar sequent coupling procedure as defined in Step 206 until the last structural article forms the end structural article of the structure. Step 208 defines the mounting of stringers to the outermost area (edges) of the structural articles by means of bolts. Step 209 defines the releasing of the fixing and the coupling arrangement from the assembly of the structural articles. Step 210 defines the transportation of the fixing and the coupling arrangement from the structure to the storage means so that the arrangements can be used again in the production line. Step 211 defines the transportation of the structure to a storage facility. Alternatively, the finished structure can be transported directly to a work-shop for mounting to other structures. In Step 212 the previous steps 205 to 211 are repeated for manufacture of a subsequent structure by said production line. Step 213 defines the stop of manufacture of aeronautical structures.

Figure 9:
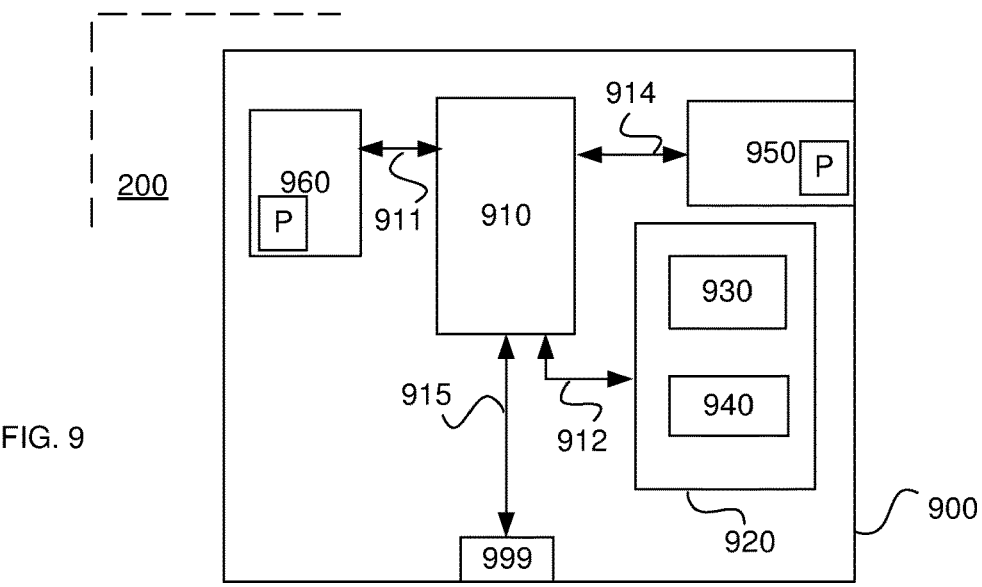
FIG. 9 illustrates a control unit according to one aspect of the invention.

FIG. 9 illustrates a device 900 (such as a computer) according to one aspect of the invention. The control unit 200 of the production line described in FIG. 7 can preferably comprise the device 900. The device 900 comprises a non-volatile memory NVM 920 which is a computer memory that can retain stored information even when the computer is not powered. The device 900 further comprises a processing unit 910 and a read/write memory 950. The NVM 920 comprises a first memory unit 930. A computer program (which can be of any type suitable for any operational data base and may use for example the above-mentioned data interface model) is stored in the first memory unit 930 for controlling the functionality of the device 900, as a parameter of e.g. the production line in FIG. 7.

Furthermore, the device 900 comprises a bus controller (not shown), a serial communication port (not shown) providing a physical interface, through which information transfers separately in two directions. The device 900 also comprises any suitable type of I/O module (not shown) providing input/output signal transfer, an A/D converter (not shown) for converting continuously varying signals from detectors (not shown) of the production line and other monitoring units (not shown) of the production line into binary code suitable for the computer.

The device 900 also comprises an input/output unit (not shown) for adaption to time and date. The device 900 also comprises an event counter (not shown) for counting the number of event multiples that occur from independent events in the production line. Furthermore the device 900 includes interrupt units (not shown) associated with the computer for providing a multi-tasking performance and real time computing in said production line. The NVM 920 also includes a second memory unit 940 for external controlled operation.

A data medium storing program P comprising driver routines adapted for drivers (not shown) and provided for operating the device 900 for performing the present method described herein. The data medium storing program P comprises routines for causing in a production line an automatic or semi-automatic manufacture of an aeronautical structure. The data medium storing program P comprises a program code stored on a medium, which is readable on the computer, for causing the control unit 200 to perform a manufacture method of an aeronautical structure by holding in mutual position a first structural article relative a second structural article, using a fixing arrangement releasable coupled to a coupling arrangement of the articles, wherein the method includes the steps of providing the first and second structural article; providing the fixing and the coupling arrangement; positioning the first structural article and the coupling arrangement; coupling the fixing arrangement to the coupling arrangement of the first structural article; coupling the coupling arrangement of the second structural article to the fixing arrangement; repeating the previous steps until the last structural article is the last to be assembled in said structure; and releasing the fixing and the coupling arrangement from the structure after mounting of complementary structural articles to the structural articles.

The data medium storing program P further may be stored in a separate memory 960 and/or in a read/write memory 950. The data medium storing program P is in this embodiment stored in executable or compressed data format.

It is to be understood that when the processing unit 910 is described to execute a specific function that involves that the processing unit 910 executes a certain part of the program stored in the separate memory 960 or a certain part of the program stored in the read/write memory 950.

The processing unit 910 is associated with a data port 999 for communication via a first data bus 915. The non-volatile memory NVM 920 is adapted for communication with the processing unit 910 via a second data bus 912. The separate memory 960 is adapted for communication with the processing unit 910 via a third data bus 911. The read/write memory 950 is adapted to communicate with the processing unit 910 via a fourth data bus 914. The data port 999 is preferably connectable to e.g. data links L201 of the production line shown in FIG. 7.

When data is received by the data port 999, the data will be stored temporary in the second memory unit 940. After that the received data is temporary stored, the processing unit 910 will be ready to execute the program code, according to the above-mentioned procedure. Preferably, the signals (received by the data port 999) comprise information about operational status of the production line, such as operational status regarding the position of end effectors (not shown) and structural articles to be assembled. It could also be operational data regarding the application of the fixture device and fixing arrangement positions. According to one aspect, signals received by the data port 999 may contain information about actual positions of the upper structural article shown in FIG. 7 by means of a sensor means (not shown). The received signals at the data port 999 can be used by the device 900 for controlling and monitoring a semi-automatic or automatic production line in a cost-effective way. The signals received by the data port 999 can be used for automatically moving the fixing arrangement between an assembly station (not shown) and the storage means shown in FIG. 7. They can be used for different operations in the production line by means of robot arms as e.g. shown in FIG. 7. The information preferably being measured by means of suitable sensor members arranged in each automatic apparatus of the production line. The information can also be manually fed to the control unit 200 via a suitable communication device, such as a personal computer display.

Parts of the method can also be executed by the device 900 by means of the processing unit 910, which processing unit 910 runs the data medium storing program P being stored in the separate memory 960 or the read/write memory 950. When the device 900 runs the data medium storing program P, suitable method steps disclosed herein will be executed. A data medium storing program product comprising a program code stored on a medium is also provided, which product is readable on a suitable computer, for performing the method steps, when the data medium storing program P is run on the control unit 200.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims.

For example, the fixing arrangement and the coupling arrangement can be of any suitable material and the coupling/connection between the holding tools and the respective frame article can be made by using any suitable coupling means, suitably a quick coupling means. The production line is preferably automatized, but manual operation is also possible.

The method steps can be performed in different orders. The manufacture of the structure may comprise the steps of; providing the first 3 and second 5 structural article before providing the fixing 7 and the coupling 9 arrangement or vice versa. The positioning of the first structural article 3 and the coupling arrangement 9 can be made by first mounting the coupling and thereafter mounting of the holder tool or vice versa. The mounting of the coupling to the assembly can be made either separately to the frame before assembly step or during assembly when the article is positioned in the fixture device.

The invention claimed is:

1. A jig for holding a first structural aeronautical article in mutual position relative to a second structural aeronautical article, the jig comprising:

a plurality of elongated first level connection bars having a first predetermined length and comprising a first end and a second end, each of the first ends and the second ends operatively connected to the first structural aeronautical article and the second structural aeronautical article, respectively, such that the first level connection bars are in between the first structural aeronautical article and the second structural aeronautical article;

a plurality of second level connection bars having a second predetermined length, each having first and second ends; and couplers that are releasably coupled into apertures of the first structural aeronautical article and the second structural aeronautical article, and to the first and second ends of the first and second level connection bars, wherein first ends of the second level connection bars are coupled to couplers of the second structural aeronautical article and second ends of the second level connection bars are coupled to couplers of a third structural aeronautical article, such that the second level connection bars are in between the second structural aeronautical article and the third structural aeronautical article, wherein:
- a first fixed distance between the first structural aeronautical article and the second structural aeronautical article is determined by the first predetermined length of the plurality of elongated first level connection bars; and
- a second fixed distance between the second structural aeronautical article and the third structural aeronautical article is determined by the second predetermined length of the plurality of second level connection bars.

2. The jig according to claim 1, wherein the couplers comprises quick coupling members.

3. The jig according to claim 1, wherein the plurality of first level connection bars is connectable to a base plate.

* * * * *